(12) United States Patent
Sekiguchi et al.

(10) Patent No.: US 10,960,618 B2
(45) Date of Patent: Mar. 30, 2021

(54) PUNCTURE REPAIR LIQUID HOLDING CONTAINER AND PUNCTURE REPAIR KIT

(71) Applicant: The Yokohama Rubber Co., LTD., Tokyo (JP)

(72) Inventors: Takumi Sekiguchi, Hiratsuka (JP); Daisuke Kanenari, Hiratsuka (JP)

(73) Assignee: The Yokohama Rubber Co., LTD.

( * ) Notice: Subject to any disclaimer, the term of this patent is extended or adjusted under 35 U.S.C. 154(b) by 357 days.

(21) Appl. No.: 15/763,826

(22) PCT Filed: Sep. 12, 2016

(86) PCT No.: PCT/JP2016/076844
§ 371 (c)(1),
(2) Date: Mar. 27, 2018

(87) PCT Pub. No.: WO2017/056950
PCT Pub. Date: Apr. 6, 2017

(65) Prior Publication Data
US 2018/0194088 A1    Jul. 12, 2018

(30) Foreign Application Priority Data

Sep. 29, 2015   (JP) .............................. JP2015-191788

(51) Int. Cl.
*B29C 73/16*  (2006.01)
*B65D 1/48*  (2006.01)
(Continued)

(52) U.S. Cl.
CPC .......... *B29C 73/025* (2013.01); *B29C 73/166* (2013.01); *B29C 73/24* (2013.01);
(Continued)

(58) Field of Classification Search
CPC ..... B29C 73/025; B29C 73/166; B29C 73/24; B29C 73/02; B65D 1/0207; B65D 1/48;
(Continued)

(56) References Cited

U.S. PATENT DOCUMENTS

| 2013/0138146 A1 | 5/2013 | Kojima et al. |
| 2014/0366981 A1* | 12/2014 | Taniguchi ................ B60S 5/04 |
| | | 141/38 |
| 2015/0343724 A1 | 12/2015 | Takahara |

FOREIGN PATENT DOCUMENTS

| GB | 476713 A | * 12/1937 | ................ F17C 1/06 |
| JP | S52-006288 | 1/1977 | |

(Continued)

OTHER PUBLICATIONS

International Search Report for International Application No. PCT/JP2016/076844 dated Oct. 11, 2016, 4 pages, Japan.

*Primary Examiner* — Marina A Tietjen
(74) *Attorney, Agent, or Firm* — Thorpe North & Western

(57) ABSTRACT

A puncture repair liquid holding container includes: a container main body provided with and opening portion and a holding portion where puncture repair liquid is held; and a cap attached to the opening portion; wherein a cross-sectional shape of the holding portion is non-true circular, and a metal reinforcing member provided around an entire circumference of the holding portion is provided on at least a portion of the holding portion in a height direction.

7 Claims, 8 Drawing Sheets

(51) Int. Cl.
  *B29C 73/02* (2006.01)
  *B65D 25/20* (2006.01)
  *B65D 25/34* (2006.01)
  *B65D 1/02* (2006.01)
  *B29C 73/24* (2006.01)
  *B60S 5/04* (2006.01)

(52) U.S. Cl.
  CPC .............. *B60S 5/04* (2013.01); *B65D 1/0207* (2013.01); *B65D 1/48* (2013.01); *B65D 25/20* (2013.01); *B65D 25/34* (2013.01); *B65D 1/023* (2013.01); *B65D 2501/0081* (2013.01)

(58) Field of Classification Search
  CPC ........ B65D 25/20; B65D 25/34; B65D 1/023; B65D 2501/0081; B60S 5/04
  See application file for complete search history.

(56) References Cited

FOREIGN PATENT DOCUMENTS

| | | |
|---|---|---|
| JP | 2009-248982 | 10/2009 |
| JP | 2011-098458 | 5/2011 |
| JP | 2013-230603 | 11/2013 |
| JP | 2014-121820 | 7/2014 |
| JP | 2014-121863 | 7/2014 |
| WO | WO 2011/055633 | 5/2011 |
| WO | WO 2014/097847 | 6/2014 |

\* cited by examiner

PUNCTURE REPAIR LIQUID HOLDING CONTAINER AND PUNCTURE REPAIR KIT

TECHNICAL FIELD

The present technology relates to a puncture repair liquid holding container and a puncture repair kit, and particularly relates to a puncture repair liquid holding container and puncture repair kit which can reduce weight and save resources by making the container thinner while maintaining pressure resistance and enhancing storing capacity.

BACKGROUND ART

In recent years, when a tire mounted to a vehicle is punctured, flat tire repair liquid is injected into the tire via the tire valve to temporarily repair the puncture. An example of a device capable of the temporary repair includes a puncture repair kit. Employing such a flat tire repair kit eliminates the need to provide the vehicle with a spare tire, which enables resource saving and reduced weight of a vehicle. Furthermore, there is an advantage where a spare tire mounting space of a vehicle can be used for another purpose.

For example, a so-called force feed puncture repair kit where puncture repair liquid stored in a puncture repair liquid holding container is injected into a tire by compressed air supplied from an air compressor is known as the puncture repair kit (for example, refer to Japanese Unexamined Patent Application Publication No. 2014-121863). The puncture repair liquid holding container used in the force feed puncture repair kit is primarily configured from a resin material, but the container is required to withstand the pressure of compressed air supplied from the air compressor. Therefore, the puncture repair liquid holding container used in the force feed puncture repair kit forms a cylindrical shape such that a cross-sectional shape basically forms a true circle with excellent pressure resistance.

However, the cylindrical container (where the cross-sectional shape is a true circle) has problems where the space occupied when mounted in a vehicle is large and storing properties are inferior as compared to a square tubular container (where the cross-sectional shape is not a true circle) with the same volume, for example. Furthermore, when considering the holding amount (in other words, holding efficiency) of the container with regard to the space occupied when mounted, the square tubular container (where the cross-sectional shape is not a true circle) can be said to be more excellent than the cylindrical container (where the cross-sectional shape is a true circle), for example. Therefore, making the cross-sectional shape of the container into a non-true circle such as an essentially square shape, elliptical shape, or the like is considered in order to enhance the storing properties and holding efficiency, but when the cross-sectional shape is not a true circle, linear sites or arcuate portions having a smaller curvature than other sites in a cross section on at least a portion of a container side surface are included, and therefore, problems exist where the sites are structurally weak, and pressure resistance is significantly more reduced than if the cross-sectional shape is a true circle. At this time, even in a case where the wall thickness of the container is thick in order to ensure pressure resistance, there is a possibility that storing properties are inhibited due to increased volume of the container, and storing efficiency deteriorates due to reduced capacity of the container, which is inconvenient. In addition, the weight of the container increases in conjunction with increased wall thickness, and therefore, reduction in weight of the puncture repair kit is difficult, and furthermore, reducing the amount of material used for configuring the puncture repair liquid holding container in an effort to save resources is difficult due to the need for achieving sufficient wall thickness.

SUMMARY

The present technology provides a puncture repair liquid holding container and puncture repair kit, which can reduce weight and save resources by making the container thinner while maintaining pressure resistance and enhancing storing capacity.

A puncture repair liquid holding container of the present technology includes: a container main body provided with an opening portion and a holding portion where puncture repair liquid is held; and a cap attached to the opening portion; wherein a cross-sectional shape of the holding portion is non-true circular, and a metal reinforcing member provided around an entire circumference of the holding portion is provided on at least a portion of the holding portion in a height direction.

Furthermore, a first puncture repair kit of the present technology includes: a puncture repair liquid holding container; and compressed air supplying source; wherein the puncture repair liquid holding container is configured from a container main body provided with an opening portion and holding portion where puncture repair liquid is held, and a cap attached to the opening portion, and a cross-sectional shape of the holding portion is non-true circular, a metal reinforcing member provided around an entire circumference of the holding portion is provided on at least a portion of the holding portion in a height direction, and the reinforcing member is provided with a securing mechanism with regard to the compressed air supplying source.

Alternatively, a second puncture repair kit of the present technology includes: a puncture repair liquid holding container; compressed air supplying source; and a housing for storing the puncture repair liquid holding container and compressed air supplying source; wherein the puncture repair liquid holding container is configured from a container main body provided with an opening portion and holding portion for holding the puncture repair liquid, and a cap attached to the opening portion, a cross-sectional shape of the holding portion is non-true circular, a metal reinforcing member is provided, and the reinforcing member is provided around an entire circumference of the holding portion is provided on at least a portion of the holding portion in a height direction.

As described above, with the puncture repair liquid holding container of the present technology, a metal reinforcing member provided around an entire circumference of a holding portion is provided on at least a portion of the holding portion in a height direction, and therefore, even if the cross-sectional shape of the holding portion is not a true circle, sufficient pressure resistance can be ensured for the puncture repair liquid holding container. In other words, excellent storing properties and holding efficiency due to a non-true circle cross-sectional shape can be achieved while ensuring sufficient pressure resistance. At this time, the holding portion where the cross-sectional shape is not a true circle is structurally weaker than in a case where the cross-sectional shape is a true circle, and therefore, a thick wall was conventionally required, but the holding portion is sufficiently reinforced by the aforementioned reinforcing member, and thus the wall thickness is not required to be thick, and the aforementioned excellent storing properties and holding efficiency can be effectively demonstrated. Furthermore, reduction in weight and resource saving can be achieved by reducing the wall thickness of the holding portion as compared to the conventional while maintaining pressure resistance.

Similarly, with the first and second puncture repair kits of the present technology, a metal reinforcing member provided around an entire circumference of a holding portion is provided on at least a portion of the holding portion in a height direction, and therefore, even if the cross-sectional shape of the holding portion is not a true circle, sufficient pressure resistance can be ensured for the puncture repair liquid holding container, and pressure resistance as well as storing properties and holding efficiency can be established. Furthermore, reduction in weight and resource saving can be achieved by reducing the wall thickness of the holding portion as compared to the conventional while maintaining pressure resistance. Herein, with the first puncture repair kit, the reinforcing member provides a securing mechanism with regard to the compressed air supplying source, and therefore, the puncture repair liquid holding container can be secured to the compressed air supplying source during puncture repair work to enhance the stability of the puncture repair liquid holding container, and the puncture repair liquid holding container can be prevented from falling over. At this time, the cross-sectional shape of the holding portion is not a true circle, and therefore, stability of combining the puncture repair liquid holding container and compressed air supplying source can also be enhanced. On the other hand, with the second puncture repair kit, the cross-sectional shape of the holding portion is not a true circle, and therefore, the puncture repair liquid holding container can be stored in a housing along with the compressed air supplying source without producing a large excess space in the housing.

With the puncture repair liquid holding container of the present technology, the reinforcing member is preferably strip shaped or linear. By using this shape, the weight of the reinforcing member can be prevented from increasing due to the reinforcing member becoming bulky, and the storing properties of the entire puncture repair liquid holding container including the reinforcing member can be prevented from deteriorating.

With the puncture repair liquid holding container of the present technology, the tensile elasticity per unit cross-sectional area of the reinforcing member is preferably 1.2 to 100 times the tensile elasticity per unit cross-sectional area of the holding portion. By setting to this elasticity, the puncture repair liquid holding container can be effectively reinforced by the reinforcing member, which is advantageous in achieving sufficient pressure resistance.

The second puncture repair kit of the present technology can be configured such that the housing provides a storing portion for detachably storing the puncture repair liquid holding container, and the reinforcing member is incorporated around the storing portion. Alternatively, the kit can be configured such that the housing provides a storing portion for detachably storing the puncture repair liquid holding container where the reinforcing member is provided around the holding portion.

Note that "cross-sectional shape" in the present technology refers to the shape of cross section orthogonal in a height direction (axial direction) of the container main body (holding portion) of the puncture repair liquid holding container.

DETAILED DESCRIPTION

A configuration of the present technology will be described in detail below while referring to that attached drawings.

Figure 1:
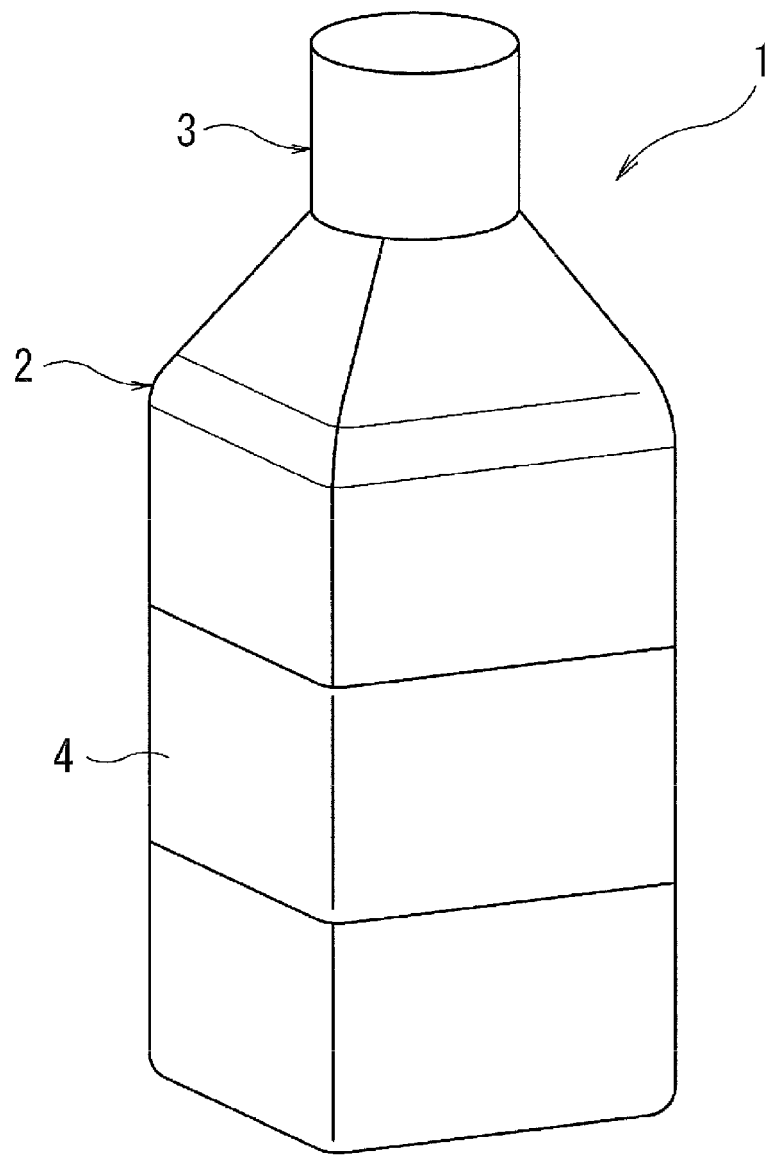
FIG. 1 is a perspective view illustrating an example of a puncture repair liquid holding container of the present technology.
Figure 2:
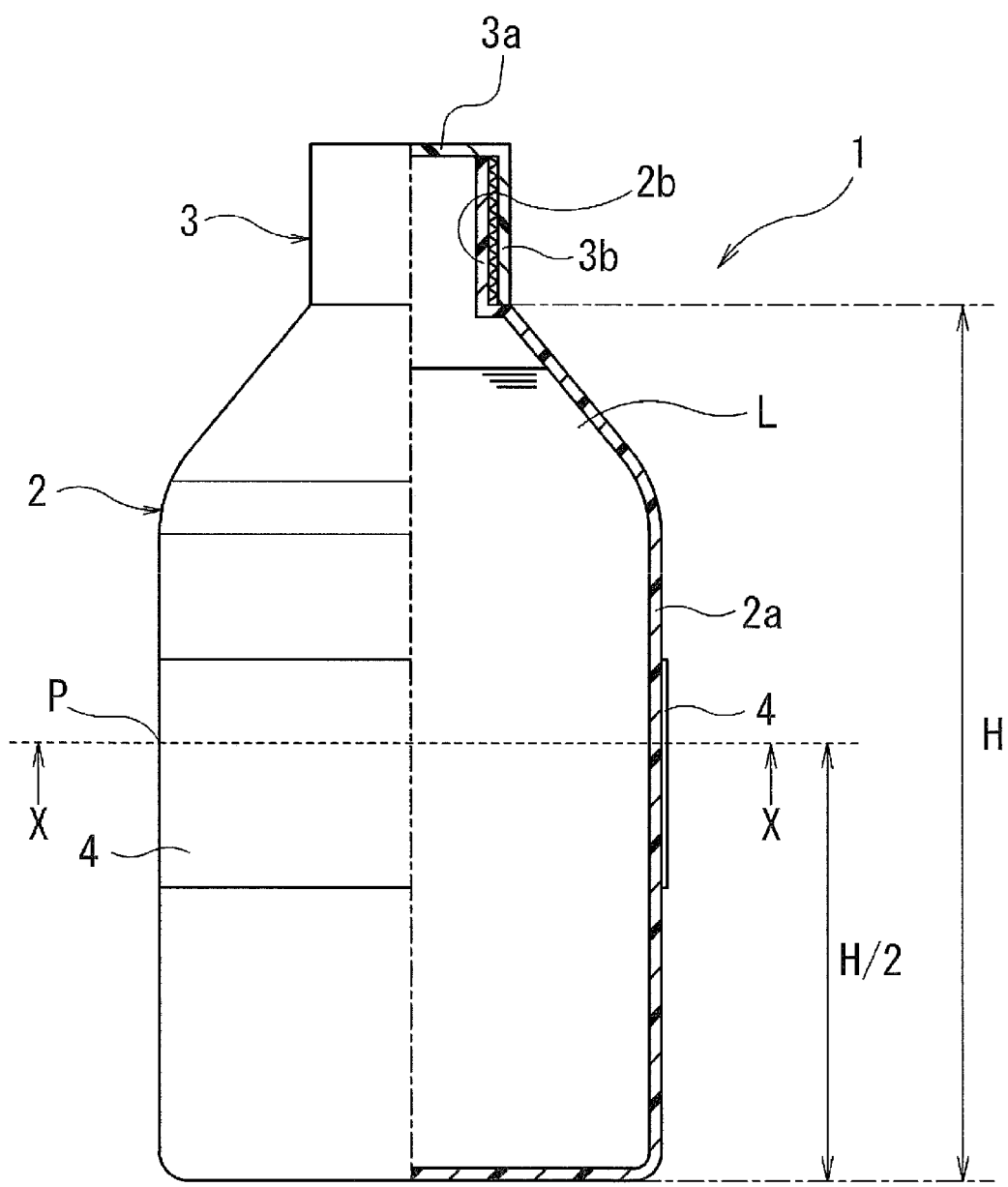
FIG. 2 is a front view illustrating a cut-out portion of the puncture repair liquid holding container in FIG. 1.

As illustrated in FIGS. 1 and 2, a puncture repair liquid holding container 1 of the present technology is configured from a container main body 2, cap 3, and reinforcing member 4.

As illustrated in FIGS. 1 and 2, the container main body 2 has an essentially square tubular shaped holding portion 2a that hold puncture repair liquid L containing rubber latex, and a cylindrical opening portion 2b positioned on an upper side of the holding portion 2a when the container main body 2 is erected, and where the puncture repair liquid L is discharged during use, for example. When the container main body 2 is erected, a bottom surface of the holding portion 2a is positioned on an opposite side from the opening portion 2b. The opening portion 2b is sealed by a film not illustrated in the drawing for example, which prevents the puncture repair liquid L in the container when not used from deteriorating, and the puncture repair L is prevented from leaking out from the container. In this embodiment, screw thread cutting is performed on an outer circumferential surface of an opening portion 6 so as to mate with a screw on a cap 3 side described later. The holding portion 2a and opening portion 2b are integrally configured from a synthetic resin such as polypropylene (PP), high density polyethylene (HDPE), or the like.

Figure 3:
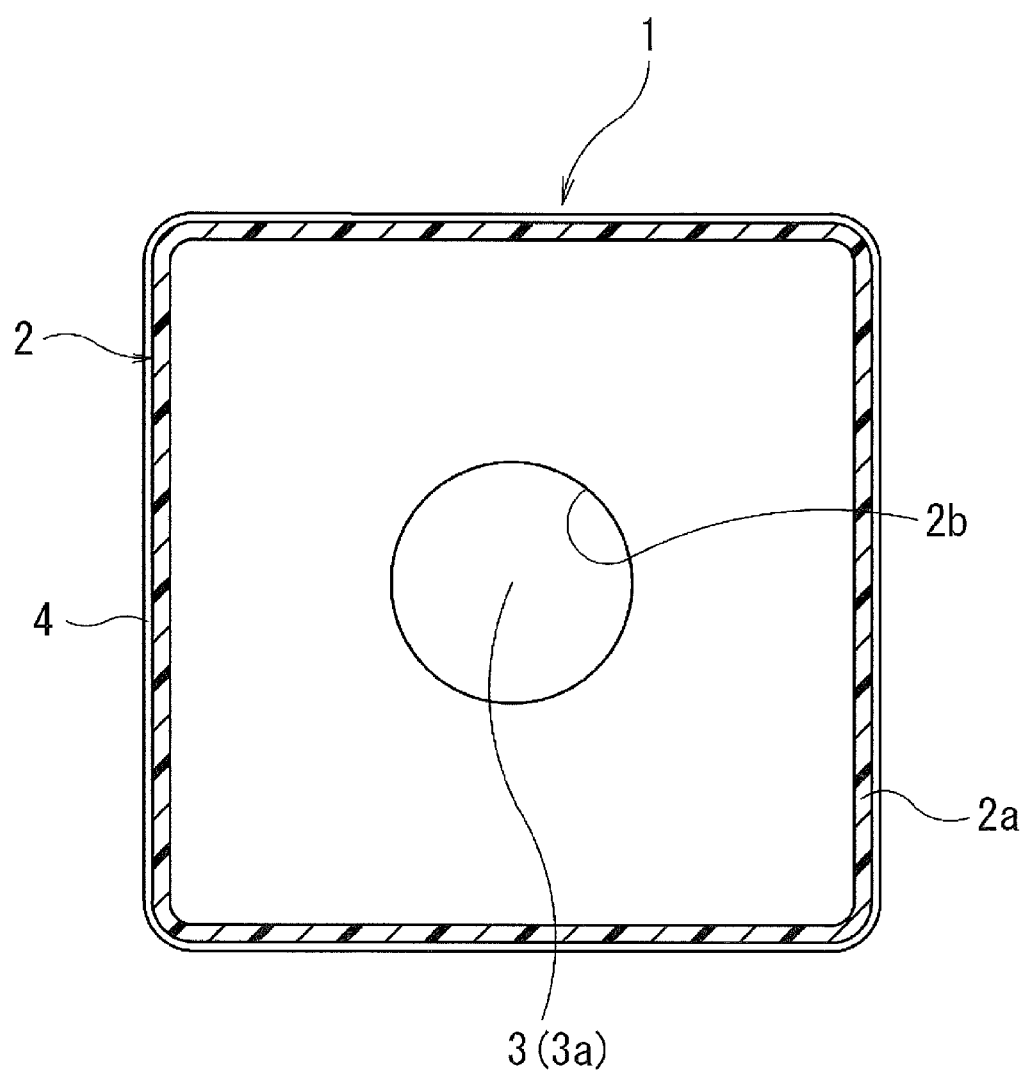
FIG. 3 is a cross-sectional view taken along arrow X-X of the puncture repair liquid holding container in FIG. 2.

Note that the holding portion 2a of the puncture repair liquid holding container 1 illustrated in FIGS. 1 and 2 has an essentially square tubular shape, and therefore, the cross-sectional shape thereof is essentially a square shape (shape where the four apexes of the square are rounded) as illustrated in FIG. 3. The holding portion 2a of the present technology is reinforced by the reinforcing member 4 as described later, and therefore, the cross-sectional shape can be a non-true circle including the essentially square shape. Note that in the present technology, "non-true circle" refers to shapes where linear sites and arcuate sites with a smaller curvature than other sites are included in at least one portion in a cross section orthogonal to the height direction (axial direction) of the holding portion 2a. Specific examples include triangles, squares, and other polygons (including shapes where the apexes are rounded as in FIG. 3, and shapes where the apexes are linearly chamfered), and elliptical shapes. When the holding portion 2a has a cross-sectional shape of a non-true circle as described above, the space occupied when mounted in a vehicle can be kept small as compared to a cylindrical container (where the cross-sectional shape is a true-circle) with the same volume, and thus excellent storing properties can be achieved. Furthermore, from the perspective of the holding amount (in other words, holding efficiency) of the container with regard to the space occupied when mounted, excellent holding efficiency can be demonstrated as compared to a cylindrical container (where the cross-sectional shape is a true circle).

For example, as illustrated in FIGS. 1 and 2, the cap 3 includes a disc-shaped vertex portion 3a and a side wall 3b surrounding an outer circumference of the vertex portion 3a in a cylindrical shape. The side wall 3b is provided on only a surface on one side of the vertex portion 3a, and screw threads that screw to screw threads formed on an outer surface of the opening portion 2b is provided on an inner surface thereof. The vertex portion 3a and side wall 3b of the cap 3 are integrally configured from a synthetic resin such as polypropylene or the like, for example. Note that the present technology relates to the holding portion 2a of the container main body 2 and the reinforcing member 4 provided in a periphery thereof as described later, and the structure of the cap 3 is not particularly limited, and therefore, in order to simplify the description, FIGS. 1 and 2 illustrate the cap 3 having a simple structure. The cap 3 is a cap 3 for protecting the opening portion 2b of the container main body 2 when not in use, and when puncture repair work is performed, the cap is replaced with a cap (not illustrated in the drawings) having a flow channel or the like for guiding out the puncture repair liquid.

In the present technology, in a case where pressure resistance is structurally inferior because the container main body 2 with increased internal pressure due to compressed air being fed when performing puncture repair work, in order to reinforce the structure, the reinforcing member 4 is provided around the container main body 2 (holding portion 2a) as described later, and therefore, the basic structure thereof is not limited to the aforementioned form so long as the cross-sectional shape of the holding portion 2a is not a true circle.

The puncture repair liquid holding container 1 of the present technology is provided with the metal reinforcing member 4 in addition to the cap 3 and container main body 2 configuring the aforementioned basic structure. In the embodiment of FIGS. 1 and 2, the reinforcing member 4 is provided around an entire circumference of the holding portion 2a on a portion in a height direction of the holding portion 2a.

The metal reinforcing member 4 is provided around the holding portion 2a in this manner, and therefore, even in a case where internal pressure increases due to compressed air fed into the container during puncture repair work, the holding portion 2a can be restrained from the periphery by the reinforcing member 4. In particular, in a case where the cross-sectional shape of the holding portion 2a is not a true circle, a linear site or arcuate site with a small curvature as compared to other sites is included in at least a portion in a cross section orthogonal to the height direction (axial direction) of the holding portion 2a, and therefore, the site is structurally weak, and pressure resistance is significantly reduced as compared to the holding portion 2a where the cross-sectional shape is a true circle, but the holding portion 2a is reinforced by the metal reinforcing member 4 as described above, and thus excellent pressure resistance can be demonstrated even in the case where the cross-sectional shape is not a true circle. In other words, the aforementioned effects (storing properties and holding efficiency) based on the cross-sectional shape being a non-true circle can be achieved while sufficiently ensuring pressure resistance. Furthermore, with a conventional container (in a case where the reinforcing member 4 is not provided) using the holding portion 2a with a cross-sectional shape that is not a true circle, the thickness of the holding portion 2a needs to be increased in order to achieve pressure resistance that can withstand practical use, but excellent pressure resistance is achieved by the reinforcing member 4, and therefore, the puncture repair liquid holding container 1 can achieve reduction in weight and resource saving by reducing the wall thickness of the holding portion 2a while maintaining sufficient pressure resistance.

The reinforcing member 4 may be disposed on at least one portion in the height direction of the holding portion 2a, but in a case where the holding portion 2a forms an essentially square tubular shape as illustrated in the drawings, a vicinity of a center position P in the height direction of the holding portion 2a is portion that is structurally weak and prone to breaking as compared to a vicinity of a bottom surface of the holding portion 2a or vicinity of the opening portion 2b (vicinity of an inclined surface continuing to the opening portion 2b), and therefore, the reinforcing member 4 is preferably disposed so as to cover a range of 50% or greater of a height H of the holding portion 2a in the height direction of the holding portion 2a from the center position P in the height direction of the holding portion 2a. By disposing the member in this manner, the holding portion 2a can be effectively reinforced, which is advantageous in maintained pressure resistance. When the reinforcing member 4 is disposed at a position outside of the range, the structurally weakest portion of the holding portion 2a cannot be sufficiently reinforced, and thus maintaining a high degree of pressure resistance is difficult.

Figure 4:
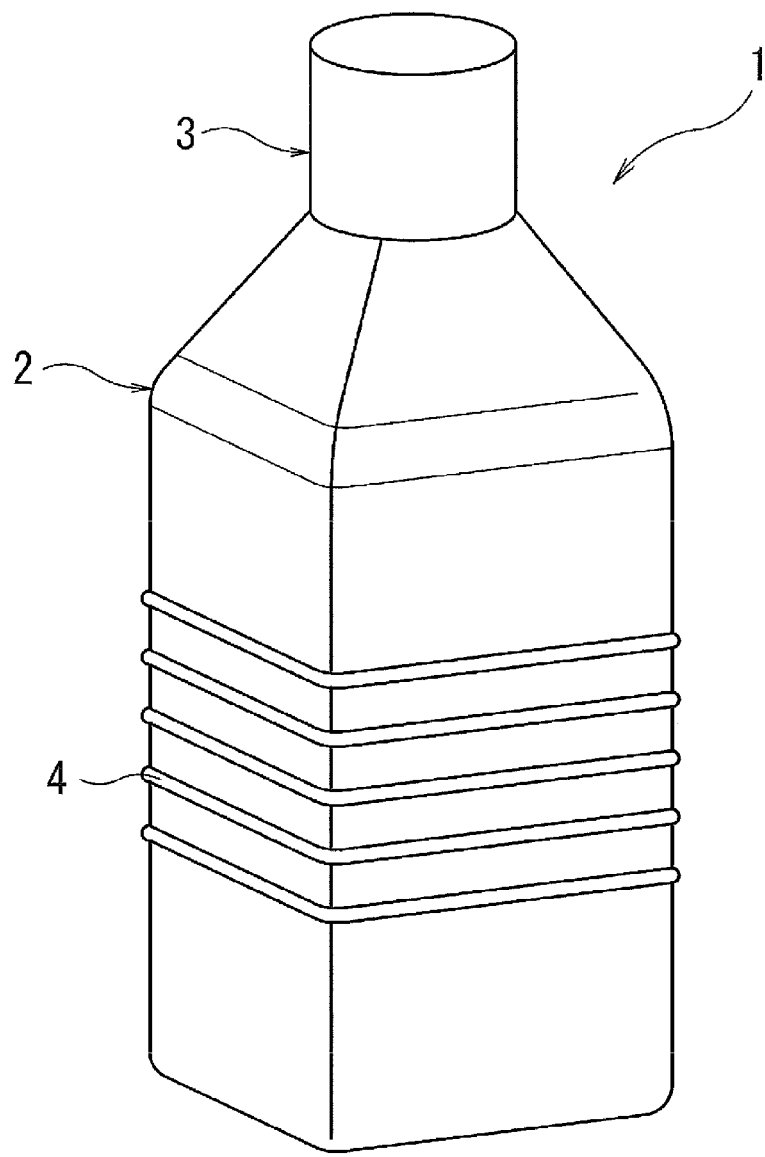
FIG. 4 is a perspective view illustrating another example of a puncture repair liquid holding container of the present technology.

The shape of the reinforcing member 4 is not particularly limited, but the reinforcing member 4 is made of metal, and therefore, for a bulky structure, even in a case where the container main body 2 is reduced in thickness, the weight of the reinforcing member 4 is increased, and thus achieving reduction in weight is difficult. Therefore, the reinforcing member 4 is preferably strip shaped as illustrated in FIGS. 1 and 2, or linear as illustrated in FIG. 4. By using this shape, the weight of the reinforcing member 4 can be prevented from increasing due to the reinforcing member 4 becoming bulky, and the storing properties of the entire puncture repair liquid holding container including the reinforcing member 4 can be prevented from deteriorating. A member premolded into an annular shape that surrounds the holding portion 2a, a wire band, a universal band, or the like may be used as the reinforcing member 4 for example.

Iron, aluminum, or the like can be used as the metal configuring the reinforcing member 4, for example. Furthermore, the tensile elasticity per unit cross-sectional area of the metal material configuring the reinforcing member 4 is preferably 1.2 times to 250 times, and more preferably 30 times to 250 times the tensile elasticity per unit cross-sectional area of material configuring the holding portion 2a. Thereby, the tensile elasticity per unit cross-sectional area of the metal material configuring the reinforcing member 4 is sufficiently increased with regard to the tensile elasticity per unit cross-sectional area of material configuring the holding portion 2a such that excellent pressure resistance based on the reinforcing member 4 is achieved, which is advantageous in reducing the wall thickness of the holding portion 2a while achieving sufficient pressure resistance. Furthermore, the metal material itself configuring the reinforcing member 4 has sufficient elasticity, and therefore, the reinforcing member 4 can be suppressed from becoming bulky, which is advantageous for improving the storing properties and reducing the weight of the puncture repair liquid holding container. At this time, when the tensile elasticity per unit cross-sectional area of the metal material configuring the reinforcing member 4 is lower than 1.2 times the tensile elasticity per unit cross-sectional area of material configuring the holding portion 2a, the tensile elasticity per unit cross-sectional area of metal material configuring the reinforcing member 4 is essentially the same as the tensile elasticity per unit cross-sectional area of material configuring the holding portion 2a, and therefore, sufficient pressure resistance cannot be achieved. When the tensile elasticity per unit cross-sectional area of metal material configuring the reinforcing member 4 is higher than 250 times the tensile elasticity per unit cross-sectional area of material configuring the holding portion 2a, cost significantly increases and adoption is difficult.

Figure 5:
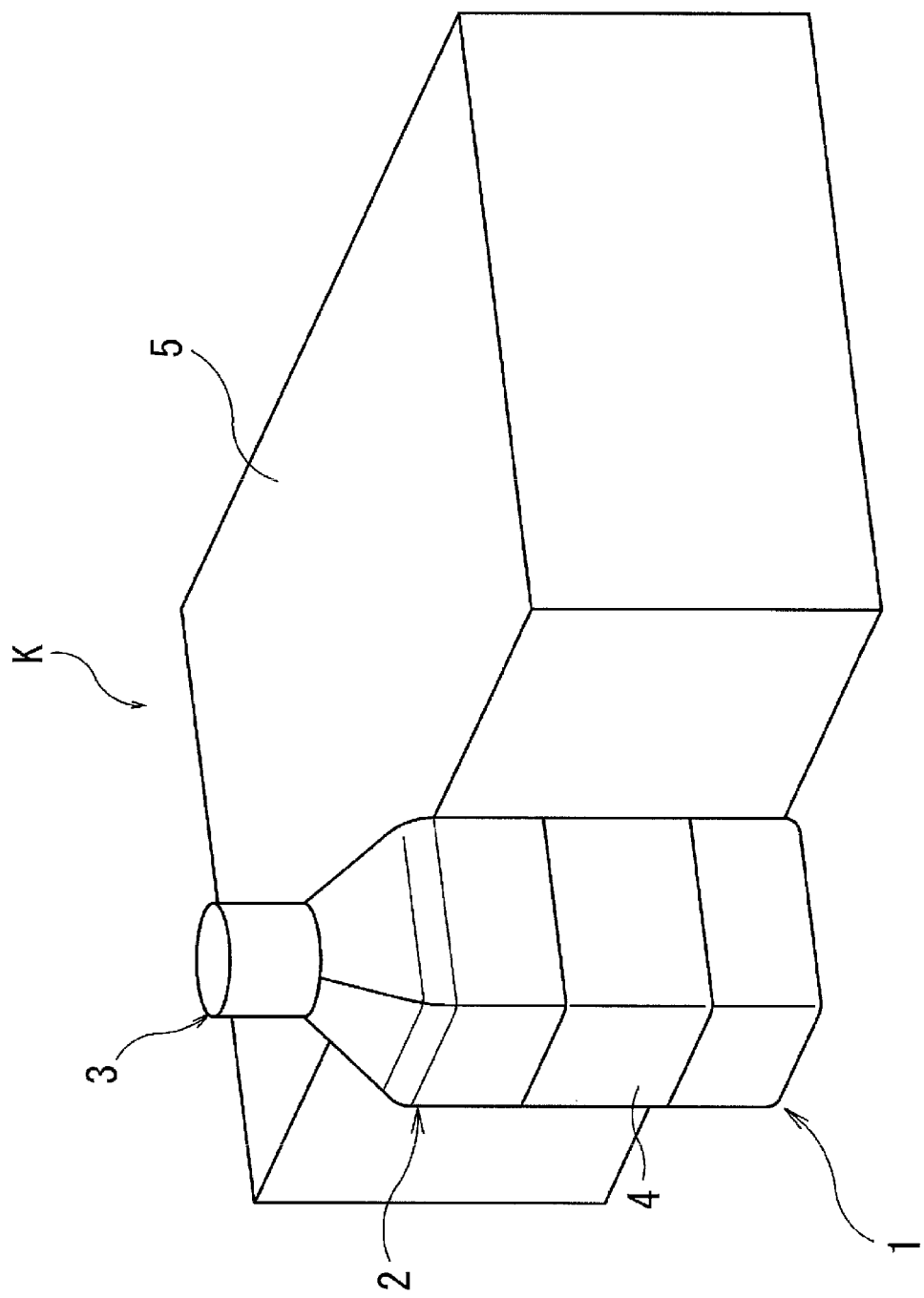
FIG. 5 is a perspective view illustrating an example of a first puncture repair kit of the present technology.

The puncture repair liquid holding container 1 is often used as a puncture repair kit K along with a compressed air supplying source 5, but in this case, as illustrated in FIG. 5, a securing mechanism with regard to the compressed air supplying source 5 is preferably further provided on the reinforcing member 4 such that the puncture repair liquid holding container 1 can be secured to the compressed air supplying source 5 during puncture repair work. Note that FIG. 5 illustrates a condition where the puncture repair liquid holding container 1 is secured to the compressed air supplying source 5 through the securing mechanism (not illustrated in the drawing). Thereby, for the puncture repair kit K, the puncture repair liquid holding container 1 can be secured to the compressed air supplying source 5 during puncture repair work to enhance the stability of the puncture repair liquid holding container 1, and the puncture repair liquid holding container 1 can be prevented from falling over, in conjunction with achieving the aforementioned effect as the puncture repair liquid holding container 1. Furthermore, the cross-sectional shape of the holding portion 2a is not a true circle, and therefore, stability of combining the puncture repair liquid holding container 1 and compressed air supplying source 5 can also be enhanced.

For example, providing a hook capable of engaging with the compressed air supplying source 5 on an outer surface of the reinforcing member 4, and providing a groove or the like capable of engaging with the hook on an outer surface of the compressed air supplying source 5 can be considered as the secured mechanism. Furthermore, a pair of surface fasteners can also be provided on an outer surface of the reinforcing member 4 and an outer surface of the compressed air supplying source 5. Alternatively, the reinforcing member 4 may be secured in advance on the compressed air supplying source 5, and the puncture repair liquid holding container 1 (holding portion 2a) may be inserted in the reinforcing member 4.

Figure 6:
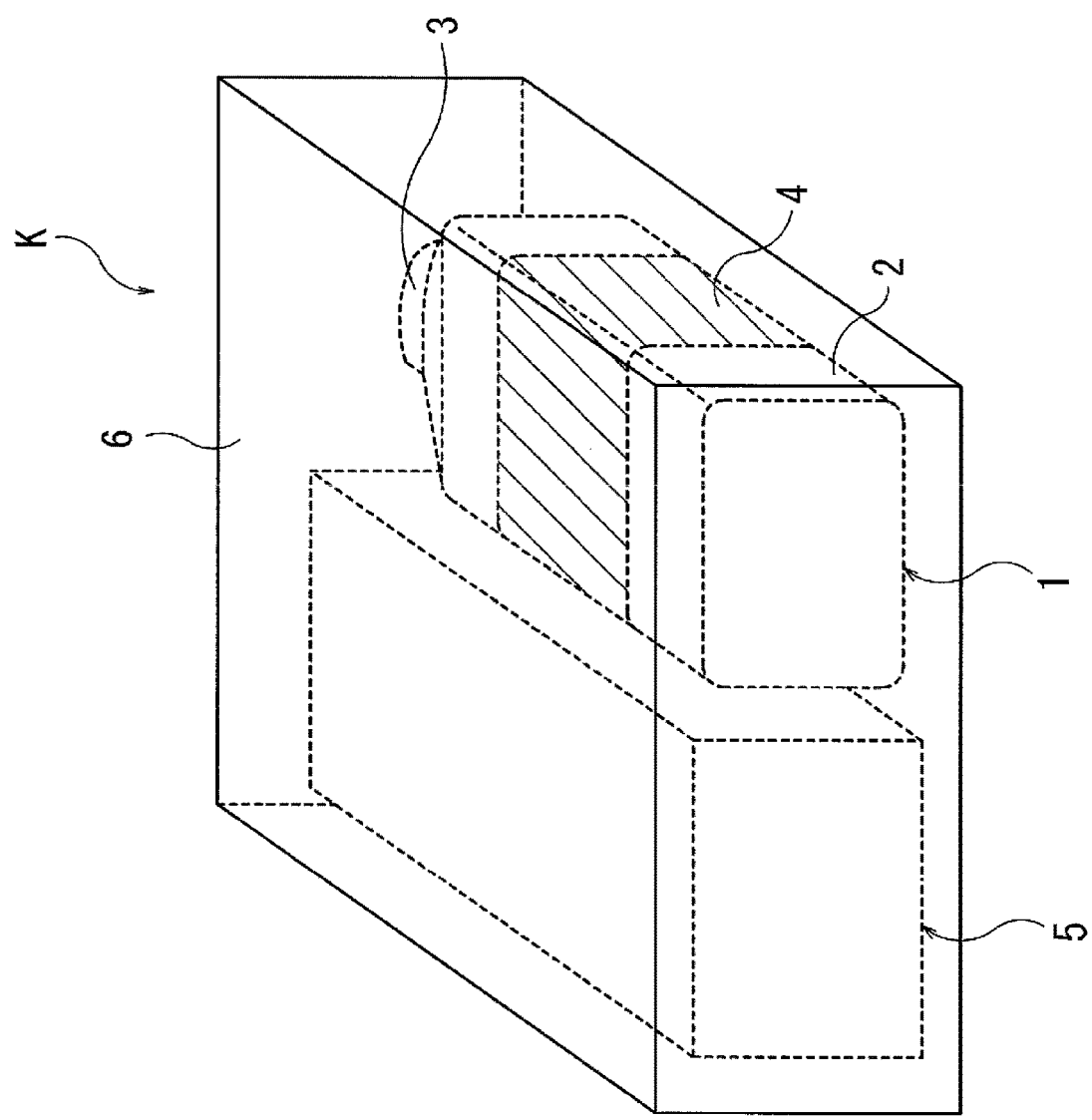
FIG. 6 is a perspective view illustrating an example of a second puncture repair kit of the present technology.

Furthermore, an embodiment of FIG. 6 can also be illustrated as another example of the puncture repair kit K. In the example of FIG. 6, the puncture repair liquid holding container 1 and compressed air supplying source 5 are stored inside a housing 6, and are integrated as the puncture repair kit K. Even in this case, the puncture repair liquid holding container 1 having the holding portion 2a where the cross-sectional shape is not a true circle is provided with the metal reinforcing member 4 disposed around the entire circumference of the holding portion 2a on at least a portion in the height direction of the holding portion 2a, and therefore, the aforementioned effect as the puncture repair liquid holding container 1 can be achieved. At this time, the cross-sectional shape of the holding portion 2a is not a true circle, and therefore, the puncture repair liquid holding container 1 can be stored in a housing 6 along with the compressed air supplying source 5 without producing a large excess space in the housing 6.

Note that in the puncture repair kit K, a mechanism that connects the puncture repair liquid holding container 1 and compressed air supplying source 5 in the housing 6, mechanism injecting the puncture repair liquid L into a tire (mechanism connected to a hose connecting the puncture repair liquid holding container 1 and tire), or the like is provided. Furthermore, the cap 3 of the puncture repair liquid holding container 1 has a structure capable of connecting to the compressed air supplying source 5, but for the case where the pressure resistance is structurally inferior because the puncture repair liquid holding container 1 has a cross-sectional shape that is not a true circle, the present technology is designed to prevent this by providing the reinforcing member 4 around the container main body 2 (holding portion 2a) as described later, and therefore, in order to simplify the description, the mechanisms are omitted in FIG. 6.

Figure 7:
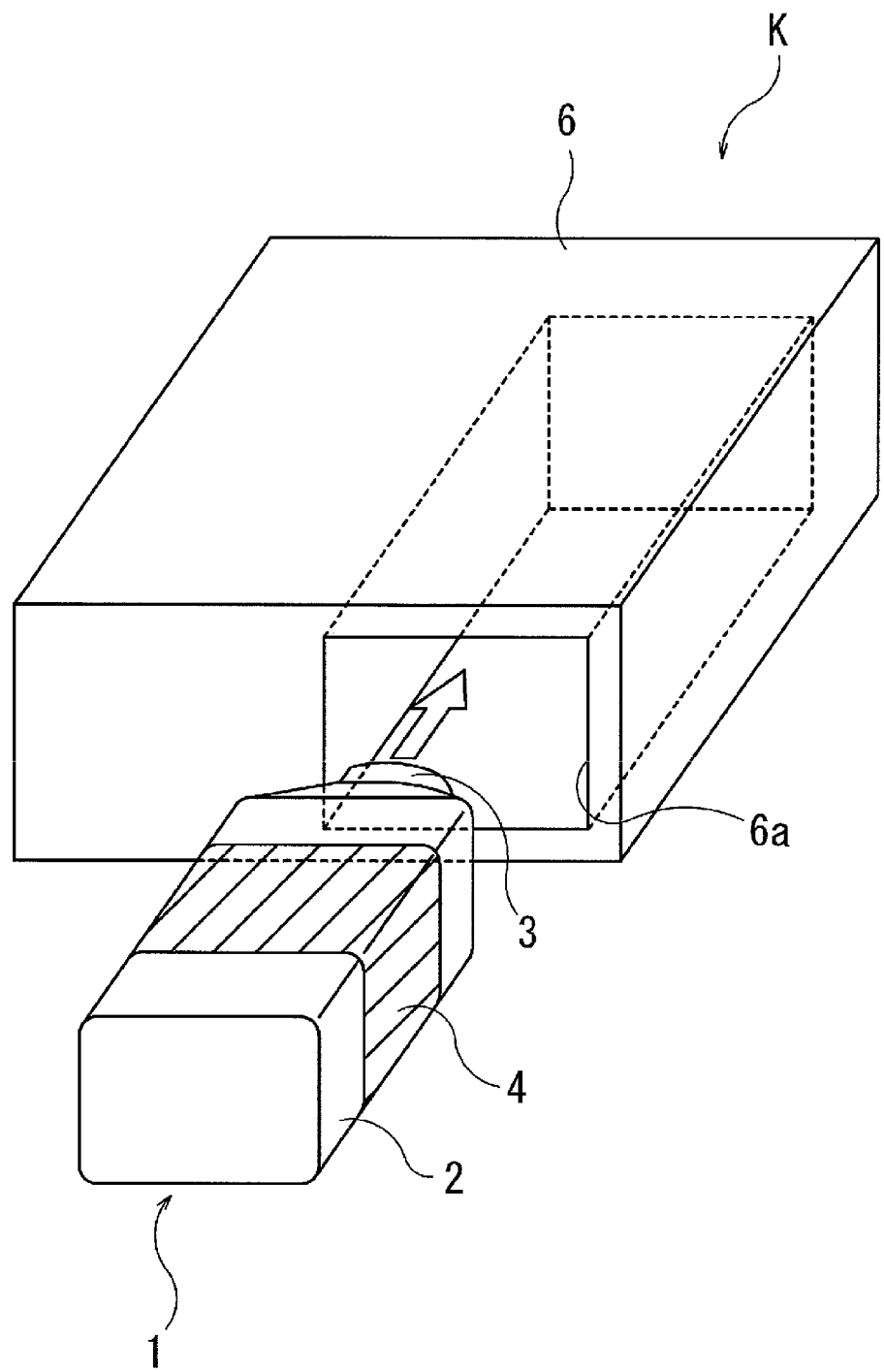
FIG. 7 is a perspective view illustrating another example of the second puncture repair kit of the present technology.
Figure 8:
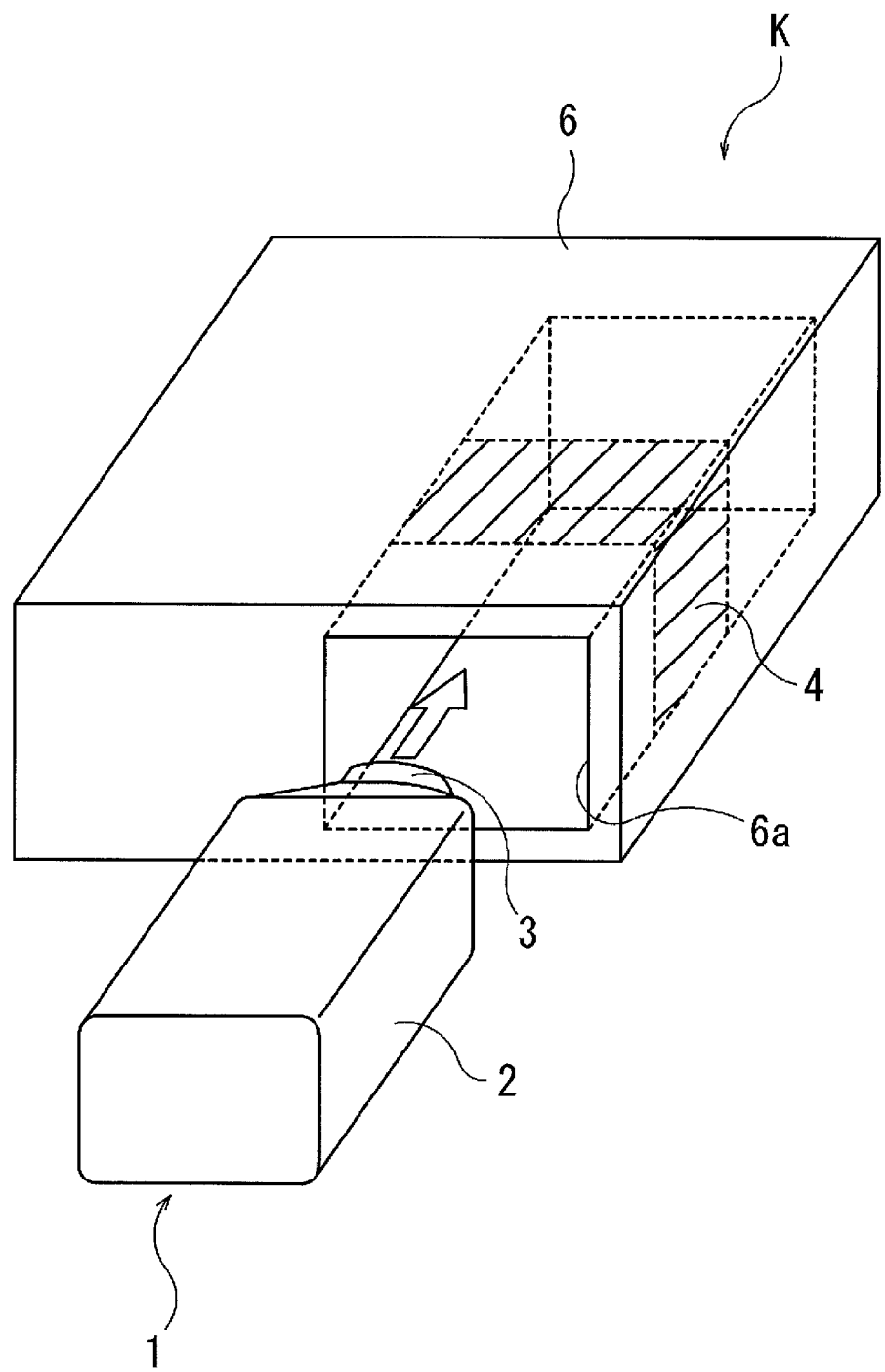
FIG. 8 is a perspective view illustrating another example of the second puncture repair kit of the present technology.

With the puncture repair kit K, the compressed air supplying source 5 or the like can normally be repeatedly used, but the puncture repair liquid holding container 1 cannot be used once the stored puncture repair liquid L is exhausted. Therefore, as illustrated in FIGS. 7 and 8, a storing portion 6a for detachably storing the puncture repair liquid holding container 1 in the housing 6 is preferably provided such that puncture repair liquid holding container 1 can be replaced. At this time, as illustrated in 7, the storing portion 6a is not configured so as to detachably store the puncture repair liquid holding container 1 provided with the reinforcing member 4, and as illustrated in FIG. 8, and the reinforcing member 4 may be disposed around the entire circumference of the holding portion 2a on at least a portion in the height direction of the holding portion 2a when the reinforcing member 4 is incorporated around the storing portion 6a itself, and the puncture repair liquid holding container 1 is stored in the storing portion 6a. In particular, with the structure in FIG. 8, the reinforcing member 4 can be re-used, and therefore, further resource saving is achieved. Note that in FIGS. 7 and 8, in order to clarify the structure of the storing portion 6a, components such as the compressed air supplying source 5 and the like stored in the housing 6 are omitted.

The invention claimed is:

1. A puncture repair liquid holding container, comprising:
   a container main body provided with an opening portion and a holding portion where puncture repair liquid is held; and
   a cap attached to the opening portion; wherein
   a cross-sectional shape of the holding portion is non-true circular, and a metal reinforcing member provided around an entire circumference of the holding portion is provided on at least a portion of the holding portion in a height direction.

2. The puncture repair liquid holding container according to claim 1, wherein the reinforcing member is strip shaped or linear.

3. The puncture repair liquid holding container according to claim 1, wherein a tensile elasticity per unit cross-sectional area of the reinforcing member is 1.2 to 250 times the tensile elasticity per unit cross-sectional area of the holding portion.

4. A puncture repair kit, comprising:

a puncture repair liquid holding container; and compressed air supplying source; wherein the puncture repair liquid holding container is configured from a container main body provided with an opening portion and a holding portion where puncture repair liquid is held, and a cap attached to the opening portion, and a cross-sectional shape of the holding portion is non-true circular, a metal reinforcing member provided around an entire circumference of the holding portion is provided on at least a portion of the holding portion in a height direction.

5. A puncture repair kit, comprising:

a puncture repair liquid holding container;

compressed air supplying source; and a housing for storing the puncture repair liquid holding container and compressed air supplying source; wherein the puncture repair liquid holding container is configured from a container main body provided with an opening portion and a holding portion for holding the puncture repair liquid, and a cap attached to the opening portion, a cross-sectional shape of the holding portion is non-true circular, a metal reinforcing member is provided, and the metal reinforcing member is provided around an entire circumference of at least a portion of the holding portion in a height direction.

6. The puncture repair kit according to claim 5, wherein the housing is provided with a storing portion for detachably storing the puncture repair liquid holding container, and the reinforcing member is incorporated around the storing portion.

7. The puncture repair kit according to claim 5, wherein the housing is provided with a storing portion for detachably storing the puncture repair liquid holding container provided around the holding portion.

* * * * *